(12) United States Patent
Hashimoto

(10) Patent No.: US 7,362,388 B2
(45) Date of Patent: Apr. 22, 2008

(54) LIQUID CRYSTAL DISPLAY DEVICE, AND OPTICAL BLOCK

(75) Inventor: Shunichi Hashimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 79 days.

(21) Appl. No.: 10/936,955

(22) Filed: Sep. 9, 2004

(65) Prior Publication Data

US 2005/0073618 A1   Apr. 7, 2005

(30) Foreign Application Priority Data

Sep. 12, 2003  (JP) ............................. 2003-322300

(51) Int. Cl.
*G02F 1/1335* (2006.01)
*G02F 1/1337* (2006.01)
*G09G 3/30* (2006.01)

(52) U.S. Cl. .............................. 349/5; 349/130; 345/80
(58) Field of Classification Search .................... 349/5, 349/130, 80; 345/80
See application file for complete search history.

(56) References Cited

U.S. PATENT DOCUMENTS

| | | | |
|---|---|---|---|
| 6,501,523 B2 * | 12/2002 | Hirota et al. ................ | 349/117 |
| 6,583,835 B1 * | 6/2003 | Yoshida et al. ............. | 349/124 |
| 2003/0112394 A1 | 6/2003 | Yoshida et al. | |
| 2005/0078387 A1 * | 4/2005 | Maeda ........................ | 359/833 |

FOREIGN PATENT DOCUMENTS

| | | |
|---|---|---|
| EP | 0 303 898 | 1/1989 |
| EP | 0303898 | 2/1989 |
| JP | 01-097092 | 4/1989 |
| JP | 01-131593 | 5/1989 |
| JP | 03-028823 | 2/1991 |
| JP | 04-367822 | 12/1992 |

(Continued)

OTHER PUBLICATIONS

Hiroshi Gokan, et a., *Fine Pattern Fabrication by Ion-beam Etching*, Vacuum, vol. 20, No. 11, pp. 17-25, 1977.

(Continued)

*Primary Examiner*—Mike Qi
(74) *Attorney, Agent, or Firm*—Sonnenschein Nath & Rosenthal LLP

(57) ABSTRACT

A reflection type liquid crystal projector is provided which includes liquid crystal display panels (5R, 5G and 5B) to modulate color rays of light (R, G and B) corresponding to three primary colors (red, green and blue), respectively, on the basis of video data and a synthesizing prism (6) to synthesize the color rays of light (R, G and B) modulated by the liquid crystal display panels (5R, 5G and 5B) into one image. The liquid crystal display panel (5G) which provides an image inverted in relation to those provided by the liquid crystal display panels (5R and 5B) is aligned in a direction (X2) different from those (X1) in which the liquid crystal display panels (5R and 5B) are aligned, so that the alignment directions (X1 and X2) of the liquid crystal display panels (5R, 5G and 5B) will be coincident with each other in an image displayed on a screen (S). Thus, color staining can be prevented from taking place on the image resulted from synthesis of the color rays of light modulated by the liquid crystal display panels (5R, 5G and 5B).

17 Claims, 13 Drawing Sheets

FOREIGN PATENT DOCUMENTS

| | | |
|---|---|---|
| JP | 06-202141 | 7/1994 |
| JP | 10-268235 | 10/1998 |
| JP | 11-289058 | 10/1999 |
| JP | 2000-137202 | 5/2000 |
| JP | 2000-314888 | 11/2000 |
| JP | 2001-066599 | 3/2001 |
| JP | 2001-166287 | 6/2001 |
| JP | 2001-228455 | 8/2001 |

OTHER PUBLICATIONS

Per G. Gloersen, *Ion-beam etching*, J. Vac. Sci. Techn. vol. 12, No. 1, pp. 28-35, 1975.

Minhua Lu, Nematic liquid-crystal technology for Si wafer-based reflective spatial light modulators, Journal of the SID Oct. 1, 2002.

Written Opinion for the counterpart Singapore Patent Application No. 200405468-0 issued by Intellectual Property Office of Singapore on Jun. 19, 2006.

Japanese Office Action for JP 2003-322300 issued Aug. 11, 1997.

\* cited by examiner

LIQUID CRYSTAL DISPLAY DEVICE, AND OPTICAL BLOCK

RELATED APPLICATION DATA

The present application claims priority to Japanese Application(s) No(s). P2003-322300 filed Sep. 12, 2003, which application(s) is/are incorporated herein by reference to the extent permitted by law.

BACKGROUND OF THE INVENTION

1. Field of the Invention

The present invention relates to a projection type liquid crystal display device which synthesizes a plurality of color rays of light modulated based on video data into one image and projects the synthetic light thus produced onto a screen to display the image, and an optical block for use in such a projection type liquid crystal display device.

This application claims the priority of the Japanese Patent Application No. 2003-322300 filed on Sep. 12, 2003, the entirety of which is incorporated by reference herein.

2. Description of the Related Art

FIG. 1 shows a projection type liquid crystal display device by way of example. This projection type liquid crystal display device, indicated with a reference 100, is a sol-called "three-panel" type liquid crystal projector. That is, the projection type liquid crystal display device 100 uses three liquid crystal display panels corresponding to three primary colors (red, green and blue), respectively.

As shown in FIG. 1, the liquid crystal projector 100 includes three polarizing beam splitters 101R, 101G and 101B, liquid crystal display panels 102R, 102G and 102B, synthesizing prism 103, projection lens 104 and a screen S'. In the liquid crystal display projection 100, light emitted from a light source such as a lamp or the like is split into three color rays of light corresponding to three primary colors, respectively. The split red light (R), green light (G) and blue light (B) are guided by the polarizing beam splitters 101R, 101G and 101B, respectively, to the liquid crystal panels 102R, 102G and 102B, respectively, which will modulate the incident red light (R), green light (G) and blue light (B), respectively, on the basis of video data. The modulated red light (R), green light (G) and blue light (B) are synthesized by the synthesizing prism 103 into one image. The synthetic light thus produced is projected through the projection lens 104 onto the screen S' on which it will be displayed as a color image in a larger scale.

Note here that each of the liquid crystal display elements used as the liquid crystal display panels 102R, 102G and 102B, respectively, is generally of either a transmission or reflection type. The transmission type liquid crystal display element will modulate light from a back light disposed at the back thereof for transmission. On the other hand, the reflection type liquid crystal display element will modulate incident light for reflection. There being demands for a projector with a higher definition of display, more compact design and a higher brightness, the reflection type liquid crystal display element has been attracting more and more attention and applied in practice as a promising display device that can be designed to display with a higher definition and have a more compact structure and also can utilize light with a higher efficiency.

More specifically, the reflection type liquid crystal display element includes a glass substrate having provided thereon a transparent electrode formed from an electrically conductive material such as ITO (Indium-Tin Oxide), a drive circuit board having provided thereon reflection pixel electrodes formed from an aluminum-based metallic material and a liquid crystal layer filled between the glass substrate and drive circuit board which are disposed opposite to each other and sealed all along the edges thereof with a sealing member. Also, each of the surfaces of the glass substrate and drive circuit board, opposite to each other, has provided thereon an alignment film to align the liquid crystal in a predetermined direction.

In the reflection type liquid crystal display element, a voltage is applied between the transparent electrode and reflection pixel electrodes opposite to each other to apply an electric field to the liquid crystal layer. Then, the liquid crystal layer is varied in optical characteristic correspondingly to a potential difference between the electrodes to modulate the light passing by the liquid crystal layer. Therefore, the reflection type liquid crystal display element can assign intensity levels by the light modulation.

The liquid crystals used as such a liquid crystal display element include a twisted nematic liquid crystal (will be referred to as "TN liquid crystal" hereunder) whose dielectric anisotropy (a difference $\Delta\epsilon(=\epsilon(\|)-\epsilon(\perp))$) between a dielectric constant $\epsilon(\|)$ parallel to the long axis of liquid crystal molecules and dielectric constant $\epsilon(\perp)$ perpendicular to the long axis of the liquid crystal molecules) goes positive. This TN liquid crystal is also called "horizontally-aligned liquid crystal". In the TN liquid crystal, when applied with no drive voltage, liquid crystal molecules are aligned being nearly horizontally twisted in relation to the substrate, and provide a display in white in a so-called "normally white display mode". On the other hand, when applied with a drive voltage, the liquid crystal molecules are erected perpendicularly to the substrate and provides a display in black. Also in the TN liquid crystal, since it is necessary to preset a direction in which the liquid crystal molecules are to be erected when applied with a drive voltage, so a constant direction is pretilted through about several to 10 deg. in practice.

Also in these days, an liquid crystal display element using a vertically-aligned liquid crystal in which nematic liquid crystal having a negative dielectric anisotropy is vertically aligned has been attracting attention because of its high contrast and speed of response. In this vertically-aligned liquid crystal, when applied with no drive voltage, the liquid crystal molecules are aligned nearly perpendicularly to the substrate and provide a display in black in a so-called "normally black display mode". On the other hand, when applied with a drive voltage, the liquid crystal molecules are tilted in a predetermined direction to have the light transmittance thereof varied due to a birefringence developed at that time of tilting.

Also, in the vertically-aligned liquid crystal, since the contrast will not be uniform as shown in FIGS. 2 and 3 unless liquid crystal molecules 200 are tilted in the same directions, so it is necessary to vertically align the liquid crystal by tilting the long axis of the liquid crystal molecules 200 through a slight pretilt angle θ in a constant direction X in relation to a line normal to a drive circuit board 202 having pixel electrodes 201 formed thereon. The pretilted direction X, that is, the direction in which the liquid crystal molecules 200 are aligned, is set nearly diagonal to a device whose transmittance is normally caused to be maximum by a combination with an optical system such as a polarization plate and the like, namely, in a direction of about 45 deg. that is a nearly diagonal direction of the pixel electrodes 201 laid in the form of a nearly square matrix. Also, if the pretilt angle θ is too large, the vertical alignment will be deteriorated, the black level will rise to lower the contrast and the V–T (drive voltage–transmittance) curve will be adversely affected. Therefore, the pretilt angle θ is normally controlled to fall within a range of 1 to 5 deg.

The alignment film which pretilts the vertically-aligned liquid crystal is an obliquely evaporated membrane formed by depositing an inorganic material such as silicon dioxide ($SiO_2$) or the like obliquely onto a substrate or a polymer membrane of polyimide or the like having a rubbed surface. The pretilting and pretilt angle are controlled by controlling the direction of incidence and evaporation angle for the obliquely-evaporated membrane or by controlling the rubbing direction and conditions for the polymer membrane. Normally, the practical pretilt angle is about 45 to 65 deg. in relation to the light normal to the substrate.

In the above Liquid crystal projector 100, if red, green and blue images for representation by the three liquid crystal display panels 102R, 102G and 102B are synthesized as they are because of the limited geometry of the liquid crystal display panels 102R, 102G and 102B in relation to the synthesizing prism 103 when the color rays of light (R, G and B) modulated by the liquid crystal display panels 102R, 102G and 102B, respectively, are synthesized by the synthesizing prism 103 into one image as shown in FIG. 1, only the green image modulated by the liquid crystal display panel 102G will be displayed being horizontally inverted in relation to the red and blue images modulated by the other liquid crystal display panels 102R and 102B, respectively (as indicated with references A and A', respectively, in FIG. 1).

That is, the green light (G) modulated by the liquid crystal display panel 102G is incident upon the projection lens 104 after passing by the dichroic surface of the synthesizing prism 103, while the red light (R) and blue light (B) modulated by the liquid crystal display panels 102R and 102B, respectively, will be incident upon the projection lens 104 after being reflected by the dichroic surface of the synthesizing prism 103 (as indicated with a solid line and dashed line, respectively, in FIG. 1).

On this account, normally, depending upon which the number of times the color rays of light (R, G and B) modulated by the three liquid crystal display panels 102R, 102G and 102B, respectively, are reflected until they are synthesized is, odd or even (including zero), an image modulated by one (102G) of the three liquid crystal display panels 102R, 102G and 102B is displayed being horizontally inverted in relation to the images modulated by the other two liquid crystal display panels (102R and 102B) (cf. the Japanese Published Unexamined Patent Application No. 2867992).

Therefore, in the aforementioned Liquid crystal projector 100, the green image modulated by the liquid crystal display panel 102G shown in FIG. 4B is displayed being horizontally inverted in relation to the red and blue images modulated by the liquid crystal display panels 102R and 102B, respectively, shown in FIG. 4A, so that the images synthesized by the synthesizing prism 103 will coincide with each other on the screen S'.

Note here that in the aforementioned conventional liquid crystal projector 100, when a leftward-ascending oblique line L in black is displayed in a white display on the screen S' as shown in FIG. 5, the oblique line L which should appear black will be displayed in a color which will be resulted from mixing of black and magenta as the case may be. Also, when a rightward-ascending oblique line in black is displayed in the white display on the screen S' in addition to the leftward-ascending line L, the oblique line L which should appear black will be displayed in greenish black in some cases. In any of these cases, the oblique line will possibly be stained with any other color, which will considerably lower the quality of an image display.

OBJECT AND SUMMARY OF THE INVENTION

It is therefore an object of the present invention to overcome the above-mentioned drawbacks of the related art by providing a projection type liquid crystal display device capable of a quality image display by preventing color staining caused by a difference between disclinations (will be described in detail later) developed in a plurality of liquid crystal display elements when synthesizing color rays of light modulated by the plurality of liquid crystal display elements into one image, and an optical block for use in such a projection type liquid crystal display device.

The above object can be attained by providing a projection type liquid crystal display device including, according to the present invention, a plurality of liquid crystal display panels provided correspondingly to a plurality of colored light and which modulate the colored light based on video data; a light synthesizing means for synthesizing the colored light modulated by the liquid crystal display panels, respectively, into one image; and a projecting means for projecting the synthetic light produced by the light synthesizing means onto a screen, wherein the alignment direction of one of the liquid crystal display panel which provides an image inverted in relation to images provided by the other liquid crystal display panels is arranged to be different from the alignment directions of other the liquid crystal display panels, so as to be coincident with each other in an image displayed on the screen.

Also the above object can be attained by providing an optical block for use in a projection type liquid crystal display device in which a plurality of colored light modulated based on video data are synthesized into one image and the synthetic light is projected as an image onto a screen, the optical block including, according to the present invention, a plurality of liquid crystal display panels provided correspondingly to the plurality of colored light and which modulate the colored light based on video data; a light synthesizing means for synthesizing the colored light modulated by the liquid crystal display panels, respectively, into one image; and wherein the alignment direction of one of the liquid crystal display panel which provides an image inverted in relation to images provided by the other liquid crystal display panels is arranged to be different from the alignment directions of other the liquid crystal display panels, so as to be coincident with each other in an image displayed on the screen.

As above, according to the present invention, the liquid crystal display panel which provides an image inverted in relation to images provided by the other liquid crystal display panels is aligned in a direction different from those in which the other liquid crystal display panels are aligned, so that the alignment directions of the liquid crystal display panels (the alignment directions of the liquid crystal molecules of the liquid crystal display panels) will be coincident with each other in an image displayed on the screen. Thus, when the light synthesizing means synthesizes the color rays of light modulated by the liquid crystal display elements into one image, disclinations taking place at each of the liquid crystal display elements can be made to coincide with each other on the screen. Therefore, it is possible to prevent color staining from taking place due to a difference in disclination between the liquid crystal display panel which provides the inverted image and the other liquid crystal display panels.

BRIEF DESCRIPTION OF THE DRAWINGS

These objects and other objects, features and advantages of the present invention will become more apparent from the following detailed description of the preferred embodiments of the present invention when taken in conjunction with the accompanying drawings, in which:

FIG. 3 shows a direction in which liquid crystal molecules are aligned, in which

DETAILED DESCRIPTION OF THE PREFERRED EMBODIMENTS

Prior to the description of the projection type liquid crystal display device and optical block according to the present invention, the previously mentioned color staining will be described in detail.

The Inventors made experiments for location of a cause of the color staining occurring in an oblique line being displayed, and found the fact that disclinations taking place in the liquid crystal display elements forming the aforementioned liquid crystal display panels 102R, 102G and 102B are deeply involved in the color staining.

First, there will be explained the disclination occurring in each of the liquid crystal display elements.

Figure 1:
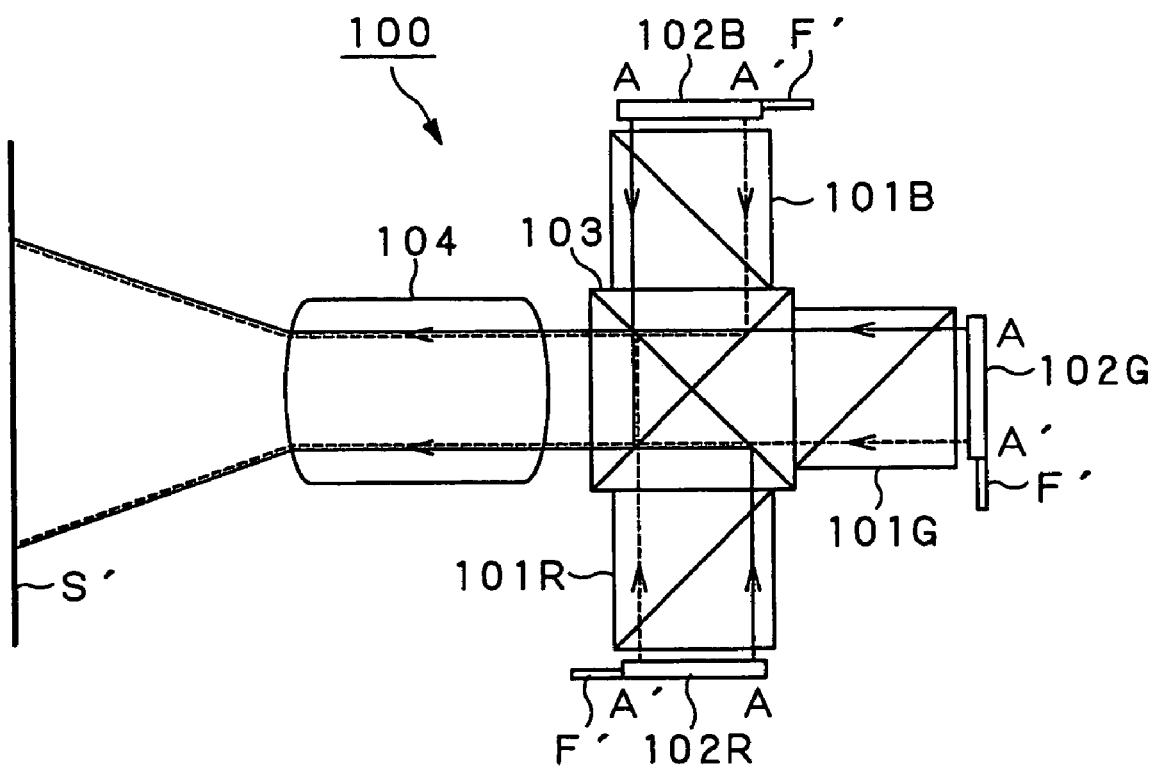
FIG. 1 is a block diagram of he substantial part of a conventional liquid crystal projector.
Figure 2:
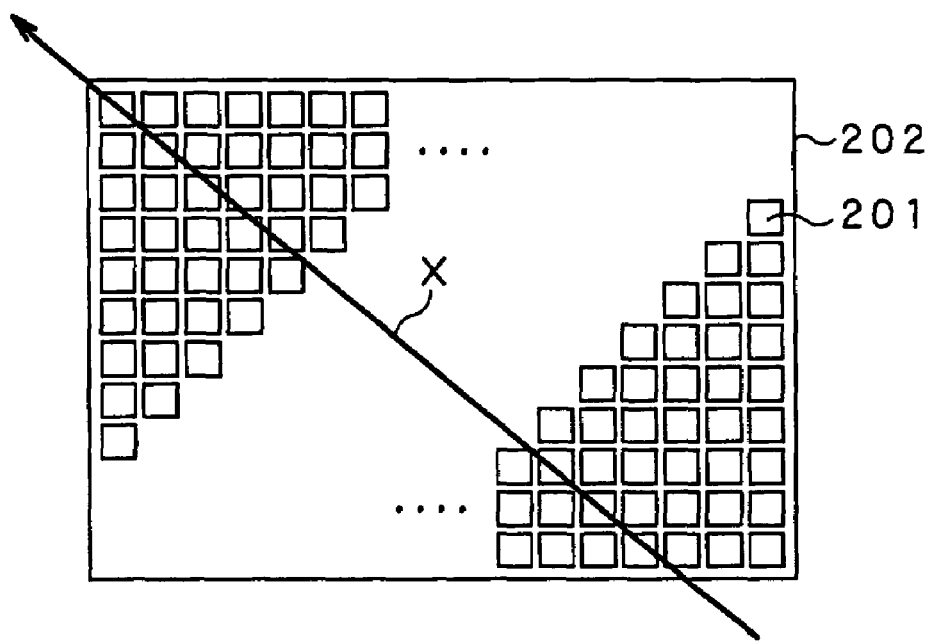
FIG. 2 is a plan view of the drive circuit board, showing pretilting of a vertically-aligned liquid crystal.
Figure 3A:
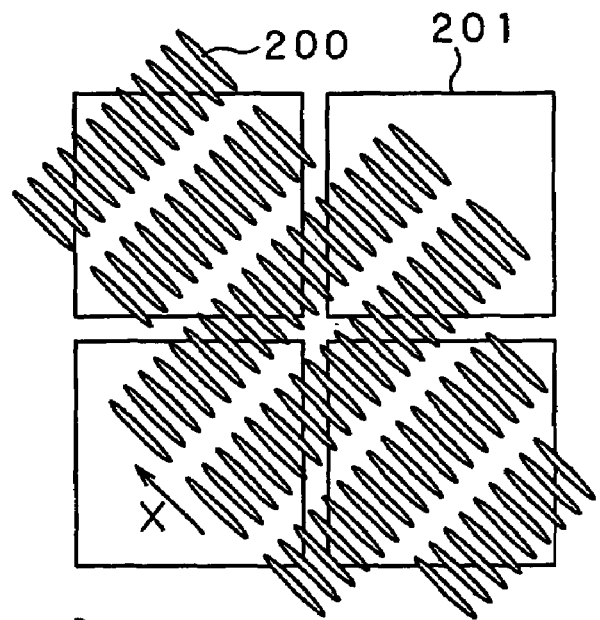
FIG. 3A is a plan view of a liquid crystal and FIG. 3B is a side elevation of the liquid crystal.
Figure 3B:
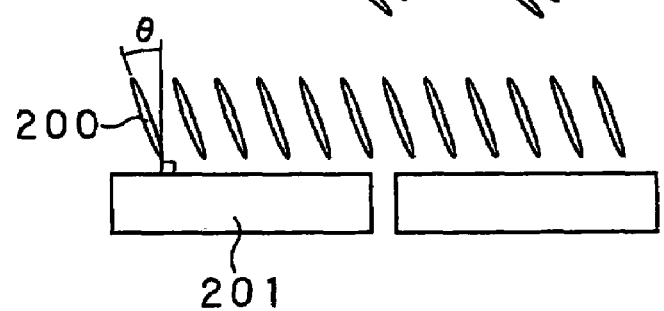

Note that since the disclination will take place on the basically same principle in the aforementioned liquid crystals whether the latter are horizontally-aligned ones or vertically-aligned ones, so explanation will be made of the disclination taking place in the vertically-aligned liquid crystal display panel shown in FIGS. 2 and 3, by way of example.

In the liquid crystal display element, when voltages of different magnitudes are applied to adjacent pixel electrodes 201, respectively, an in-plane horizontal electric field will develop between the pixels and their surrounding areas, resulting in crosstalk-caused disturbance in alignment of liquid crystal molecules 200. The disturbance in alignment of the liquid crystal molecules is generally called "disclination".

For example, in a driving method called "line inversion drive" in which the polarity of a signal voltage is inverted at each scan of a line, when the voltage polarities of adjacent pixel electrodes 201 are opposite to each other, when the voltage polarity is inverted within a range of ±5 V, for example, the difference in potential between the adjacent pixel electrodes will be as large as 10 V. Thus, liquid crystal molecules 200 corresponding to the pixels which should normally be displayed all in white will be inhibited by the horizontal electric field between the adjacent pixel electrodes 201 from being tilted, that is, the liquid crystal molecules in question will not be white but be somewhat dark, causing a stripe-like disclination.

Generally, to prevent the image quality from being deteriorated by such a disclination, the liquid crystal display element is driven by a driving method called "frame inversion drive" in which the polarity of a drive voltage is inverted for each frame. Since with this driving method, the voltages at the adjacent pixel electrodes 201 will be equal to each other when the pixels are displayed all in white, no horizontal field-caused disclination will take place. Since in a gradation display as well, the voltage polarities of at least the adjacent pixel electrodes will not be opposite to each other and the difference in potential between the adjacent pixel electrodes 201 will be a half of that in the "line inversion drive", so the crosstalk is rather smaller than in the aforementioned "line inversion drive".

Even in case the above-mentioned "frame inversion drive" method is employed, however, when a display is made with a large difference in brightness between adjacent pixels, for example, a display with white- and black-display pixels, it is difficult to prevent the image display from being influenced by a horizontal field-caused crosstalk between the adjacent pixel electrodes 201.

Next, there will be explained the difference between disclinations taking places in the liquid crystal display panels 102R and 102B shown in FIG. 4A and the liquid crystal display panel 102G shown in FIG. 4B when the black oblique line L (leftward-ascending oblique line, for example) displayed in white display on the screen S' shown in FIG. 5 as having previously been described.

The liquid crystal molecules included in the aforementioned liquid crystal display panels 102R, 102G and 102B are aligned in the same directions X1' and X2' (in the leftward-ascending direction with a flexible wire F' being viewed at the right) diagonally of the device. In this case, the alignment direction X1' in the liquid crystal display panels 102R and 102B shown in FIG. 4A is the same as the direction of the leftward-ascending oblique line L1'. On the other hand, since the liquid crystal display panel 102G in FIG. 4B provides a horizontally inverted display, a rightward-ascending oblique line L2' and alignment direction X2' form an angle of about 90 deg. between them in the plane in which they are.

Figure 4A:
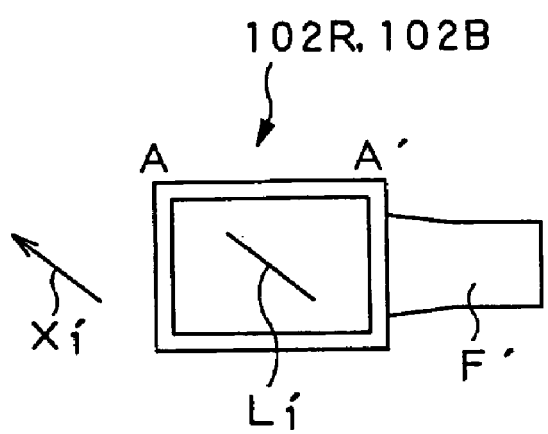
FIG. 4A is a plan view of a direction of an oblique line displayed on red and blue liquid crystal display panels included in the conventional liquid crystal projector and a alignment direction of the red and blue liquid crystal display panels.
Figure 6:
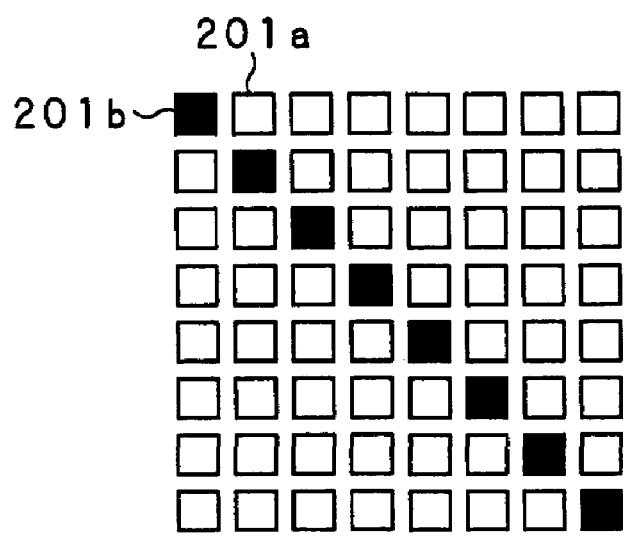
FIG. 6 is a plan view of a liquid crystal display panel, showing pixels of the panel corresponding to an oblique line displayed on the screen.
Figure 7A:
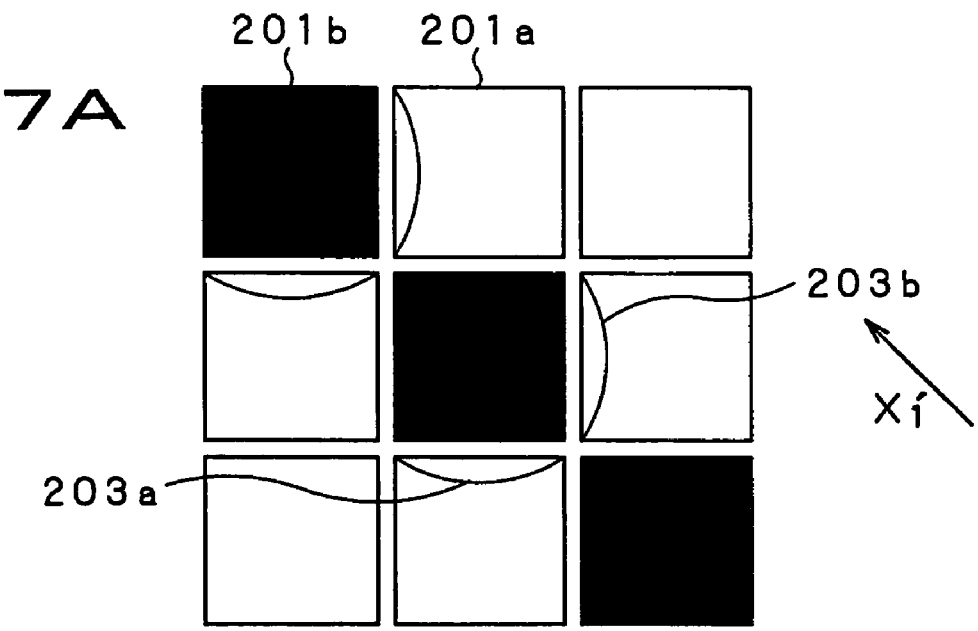
FIG. 7A is a plan view, enlarged in scale, of pixels of the red and blue liquid crystal display panels included in the conventional liquid crystal projector.

Therefore, when a leftward-ascending oblique line L1' having a thickness of one pixel is represented by black-display pixels 201b in white-display pixels 201a as shown in FIG. 6 in the liquid crystal display panels 102R and 102B in FIG. 4A, there will take place in a white-display pixel 201a adjacent to the black-display pixel 201b curved disclinations 203a and 203b extending from a corner (upper left corner shown in FIG. 7A) positioned in the alignment direction X1' along the boundary between the white-display pixel 201a and black-display pixel 201b as shown in a larger scale in FIG. 7A.

Figure 4B:
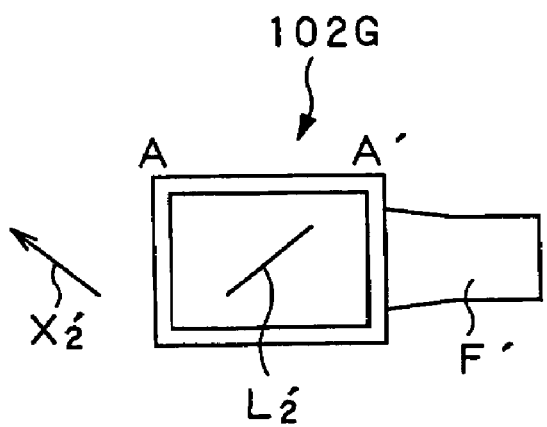
FIG. 4B is a plan view of a direction of an oblique line displayed on a green liquid crystal display panel included in the conventional liquid crystal projector and a alignment direction of the green liquid crystal display panel.
Figure 7B:
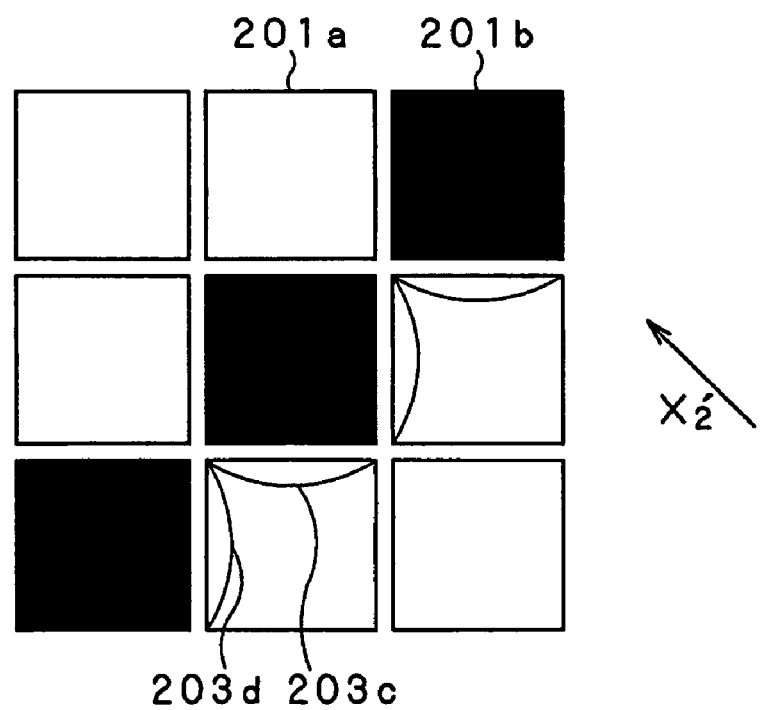
FIG. 7B is a plan view, enlarged in scale, of pixels of the green liquid crystal display panel included in the conventional liquid crystal projector.

On the other hand, since a rightward-ascending oblique line L2' having a thickness of one pixel is represented by black-display pixels 201b in the white-display pixels 201a in the liquid crystal display panel 102G shown in FIG. 4B, there will take place in a white-display pixel 201a adjacent to the black-display pixel 201b curved disclinations 203c and 203d extending from a corner (upper left corner shown in FIG. 7B) positioned in the alignment direction X2' along the boundary between the white-display pixel 201a and black-display pixel 201b as shown in a larger scale in FIG. 7B.

Note here that the horizontal electric field applied to the black-display pixels from the white-display pixels is different in size between the liquid crystal display panels 102R and 102B in FIG. 4A and the liquid crystal display panel 102G in FIG. 4B due to a difference in display between the liquid crystal display panels 102R and 102B and the liquid crystal display panel 102G.

More specifically, in the liquid crystal display panels 102R and 102B shown in FIG. 4A, the black-display pixels 201b will be adjacent to two white-display pixels 201a and one black-display pixel 201b at the upper left corner shown in FIG. 7A. In this case, since the black-display pixel 201b has the same potential as that of one black-display pixel 201b adjacent to it, so it will be little influenced by the horizontal electric field from the one black-display pixel 201b.

On the other hand, in the liquid crystal display panel 102G shown in FIG. 4B, the black-display pixels 201b will be adjacent to three white-display pixels 201a at the upper left corner shown in FIG. 7B. In this case, since the black-display pixel 201b will be greatly influenced by the horizontal electric field from the three adjacent white-display pixels 201a, which also means that the electric flux line of the electric field is different in shape.

Thus, the liquid crystal display panels 102R and 102B shown in FIG. 4A will be somewhat different in disclination output from the liquid crystal display panel 102G shown in FIG. 4B.

Figure 8:
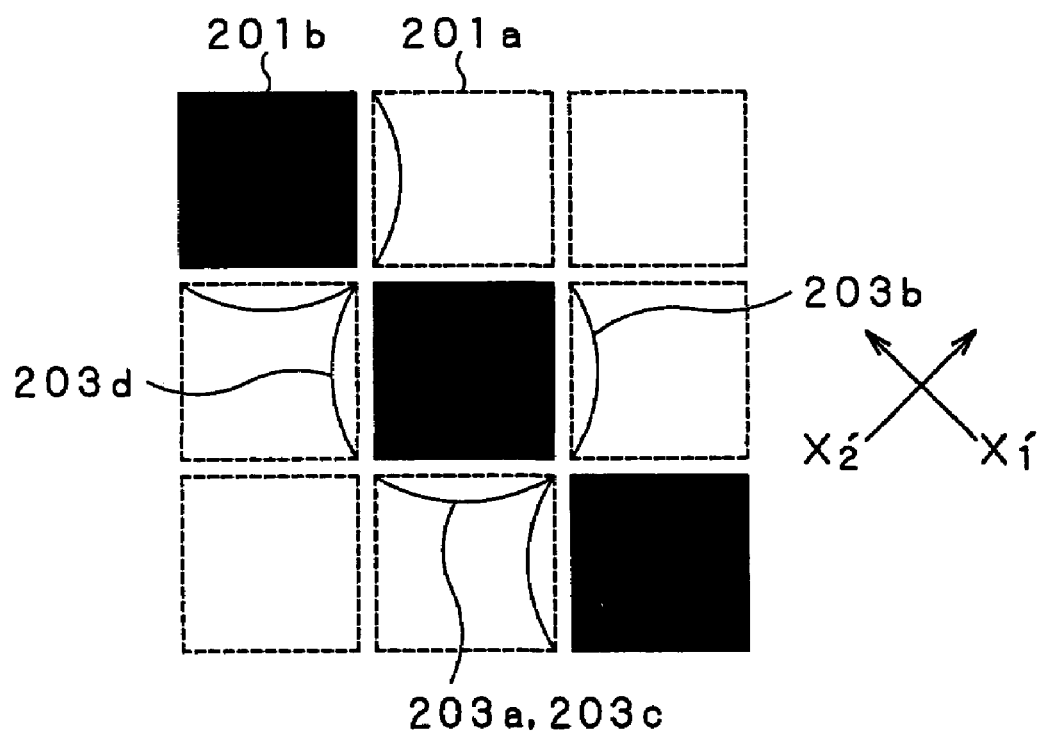
FIG. 8 is a plan view, enlarged in scale, of an oblique line projected on the screen in the conventional liquid crystal projector.

Therefore, in the aforementioned liquid crystal projector 100, color rays of light (R, G and B) modulated by the three liquid crystal display panels 102R, 102G and 102B are synthesized by the synthesizing prism 103 into one image. When a leftward-ascending oblique line L in black is displayed in white display on the screen S', the black level of the liquid crystal display panels 102R and 102B is higher than that of the liquid crystal display panel 102G due to a difference in occurrence of the aforementioned disclinations 203a, 203b, 203c and 203d as shown in a larger scale in FIG. 8. In this case, the oblique line L which should appear black will be displayed in a color which will be resulted from mixing of black and magenta.

On the contrary, when a rightward-ascending oblique line L in black is displayed in white display on the screen S', the black level of the liquid crystal display panel 102G is higher than that of the liquid crystal display panels 102R and 102B due to a difference in occurrence of the disclinations 203a, 203b, 203c and 203d. In this case, the oblique line L which should appear black will be displayed as a greenish black oblique line L.

Note that also in case an oblique line of two by two black-display pixels 201b is displayed in white-display pixels 201a, similar color staining took place around black-display pixels 201b adjacent to the white-display pixels 201a. Also, this phenomenon of color staining occurred when a white oblique line is displayed in black display. The color staining is more remarkable when the black oblique line is displayed.

As mentioned above, it was found through the Inventors' experiments that in the conventional projection type liquid crystal display device, when color rays of light modulated by a plurality of liquid crystal display elements was synthesized into one image, disclinations taking place on each of the liquid crystal display elements caused color staining which will lead to a practical problem such as deterioration of the image quality.

The present invention will be described below concerning a projection type liquid crystal display device and optical block as embodiments thereof with reference to the accompanying drawings.

Figure 9:
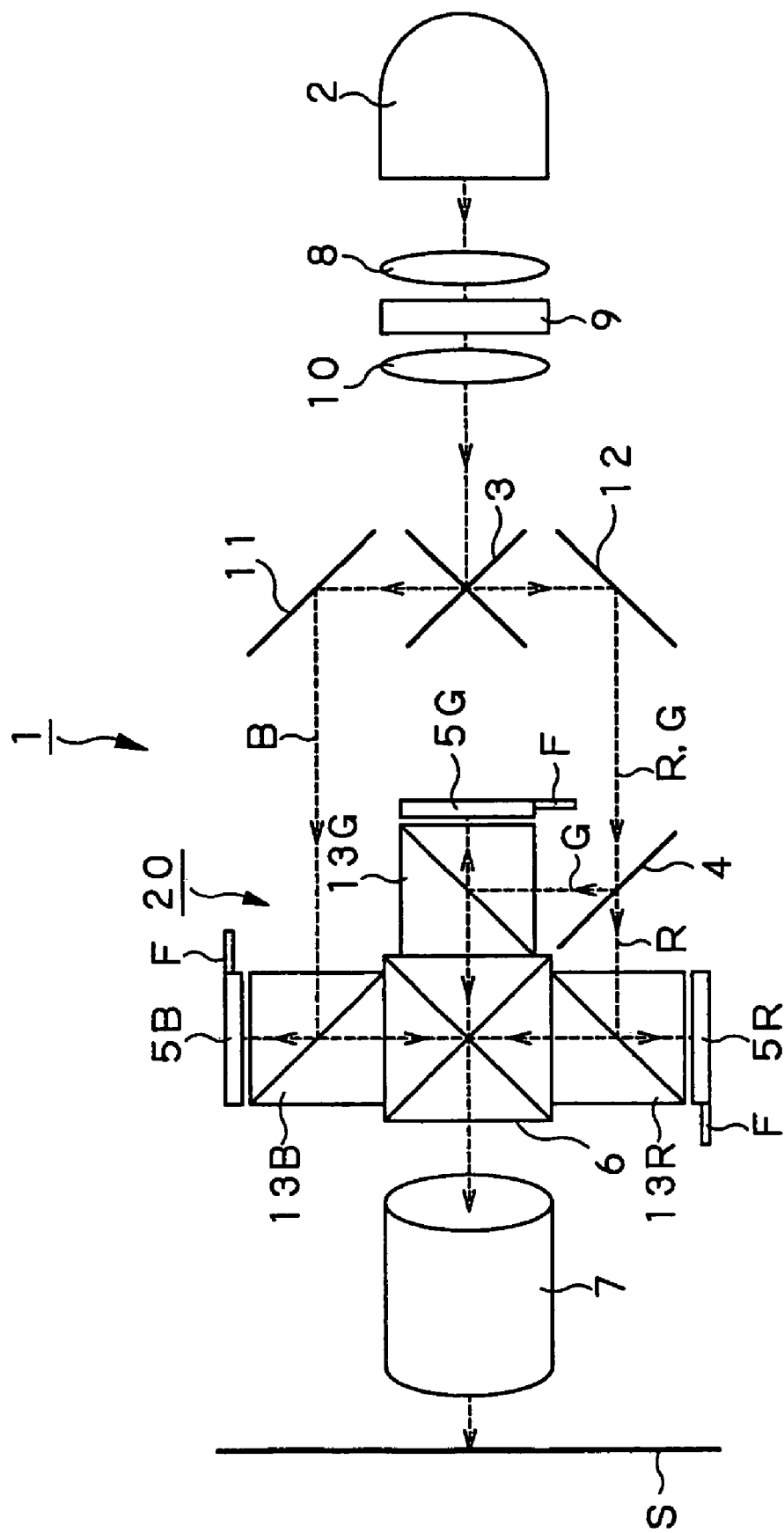
FIG. 9 is a block diagram of a liquid crystal projector according to the present invention.

Referring now to FIG. 9, there is schematically illustrated in the form of a block diagram projection type liquid crystal display device according to the present invention. As shown, the reflection type liquid crystal projector, generally indicated with a reference 1, which is of a so-called three-panel type using three reflection type liquid crystal display elements corresponding to three primary colors (red, green and blue) to display a color image in a larger scale on a screen S.

As shown, the reflection type liquid crystal projector 1 includes a lamp 2 provided as a light source to emit illumination light, a dichroic color separation filter 3 and dichroic mirror 4, provided as a light separation means for separating the illumination light from the lamp 2 into red light (R), green light (G) and blue light (B), liquid crystal display panels 5R, 5G and 5B provided correspondingly to color rays of light (R, G and B), respectively, to modulate the separated red light (R), green light (G) and blue light (B) on the basis of video data, a synthesizing prism 6 to synthesize the modulated red light (R), green light (G) and blue light (B) into one image, and a projection lens 7 to project the synthetic illumination light onto the screen S.

The lamp 2 emits white light including red light (R), green light (G) and blue light (B). It is a halogen light, metal halide lamp or xenon lamp, for example.

Also, in the light path between the lamp 2 and dichroic color separation filter 3, there are provided a fly-eye lens 8 to uniformly distribute the illumination light emitted from the lamp 2, a polarization changing element 9 to convert P- and S-polarized light components of the illumination light into one of the polarized light components (S-polarized light component, for example), a condenser lens 10 to condense the illumination light, etc.

The dichroic color separation filter 3 functions to separate the white light emitted from the lamp 2 into blue light (B) and other color rays of light (R and G), and it reflects the separated blue light (B) and other color rays of light (R and G) in opposite directions, respectively.

Also, between the dichroic color separation filter 3 and liquid crystal display panel 5B, there is provided a total-reflection mirror 11 to reflect the separated blue light (B) toward the liquid crystal display panel 5B. In addition, between the dichroic color separation filter 3 and dichroic mirror 4, there is provided a total-reflection mirror 12 to reflect the separated other color rays of light (R and G) toward the dichroic mirror 4.

The dichroic mirror 4 functions to separate the other color rays of light (R and G) into red light (R) and green light (G), and it allows the separated red light (R) to pass by toward the liquid crystal display panel 5R while reflecting the separated green light (G) toward the liquid crystal display panel 5G.

Also, between each of the liquid crystal display panels 5R, 5G and 5B and the synthesizing prism 6, there are provided polarizing beam splitters 13R, 13G and 13B to guide each of the separated color rays of light (R, G and B) to each of the liquid crystal display panels 5R, 5G and 5B.

The polarizing beam splitters 13R, 13G and 13B function to separate the incident color rays of light (R, G and B) into P- and S-polarized light components, and they reflect one of the polarized light components (S-polarized light component, for example) toward each of the liquid crystal display panels 5R, 5G and 5B and allow the other polarized light component (P-polarized light component, for example) to pass by toward the synthesizing prism 6.

Each of the liquid crystal display panels 5R, 5G and 5B includes a reflection type liquid crystal display element 50. They make polarization modulation of one of the polarized light components (S-polarized light component, for example) guided by the polarizing beam splitters 13R, 13G and 13B on the basis of a video signal, and reflect light resulted from the polarization modulation toward the polarizing beam splitters 13R, 13G and 13B.

Figure 10:
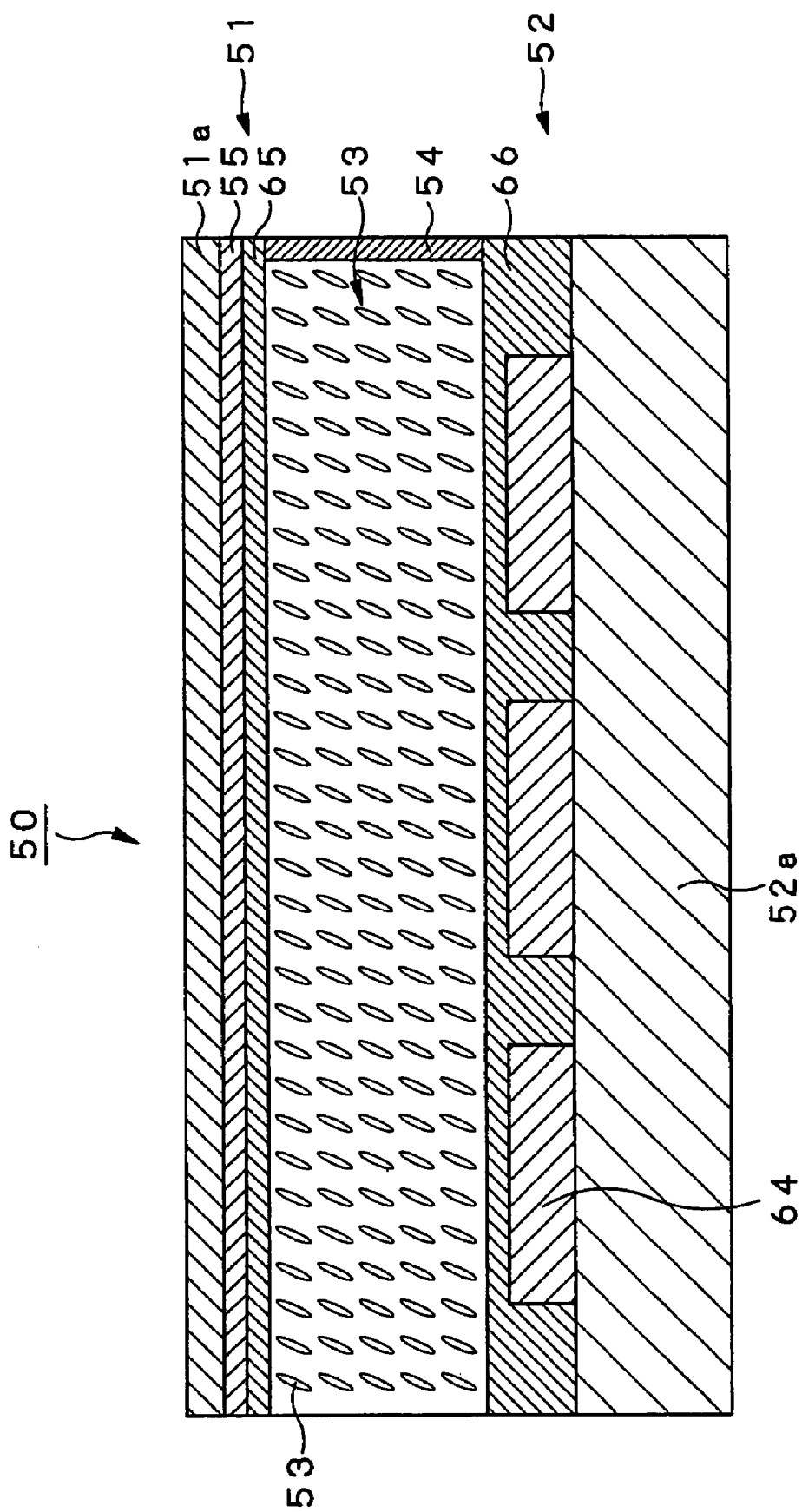
FIG. 10 is a sectional view of a reflection type liquid crystal display element.

More specifically, the reflection type liquid crystal display element 50 includes a transparent substrate 51 and drive circuit board 52 disposed opposite to each other, a liquid crystal layer 53 interposed between these transparent substrate 51 and drive circuit board 52, and a sealing member 54 to seal the edges of the transparent substrate 51 and drive circuit board 52, as shown in FIG. 10.

The transparent substrate 51 includes a glass substrate 51a having a light-transparent electrode 55 formed over a main side thereof opposite to the drive circuit board 52. The transparent electrode 55 is formed from a transparent electrically conductive material such as ITO (Indium-Tin Oxide) which is a solid solution of tin oxide ($SnO_2$) and indium oxide ($In_2O_3$), for example, and is to be applied in entire pixel area with a common potential (ground potential, for example).

Figure 11:
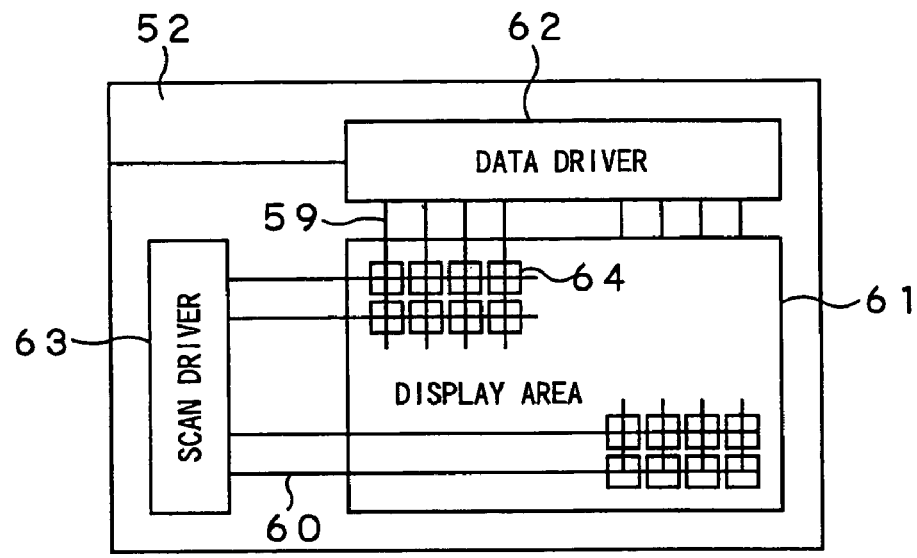
FIG. 11 is a schematic diagram of the drive circuit board included in the reflection type liquid crystal display element.
Figure 12:
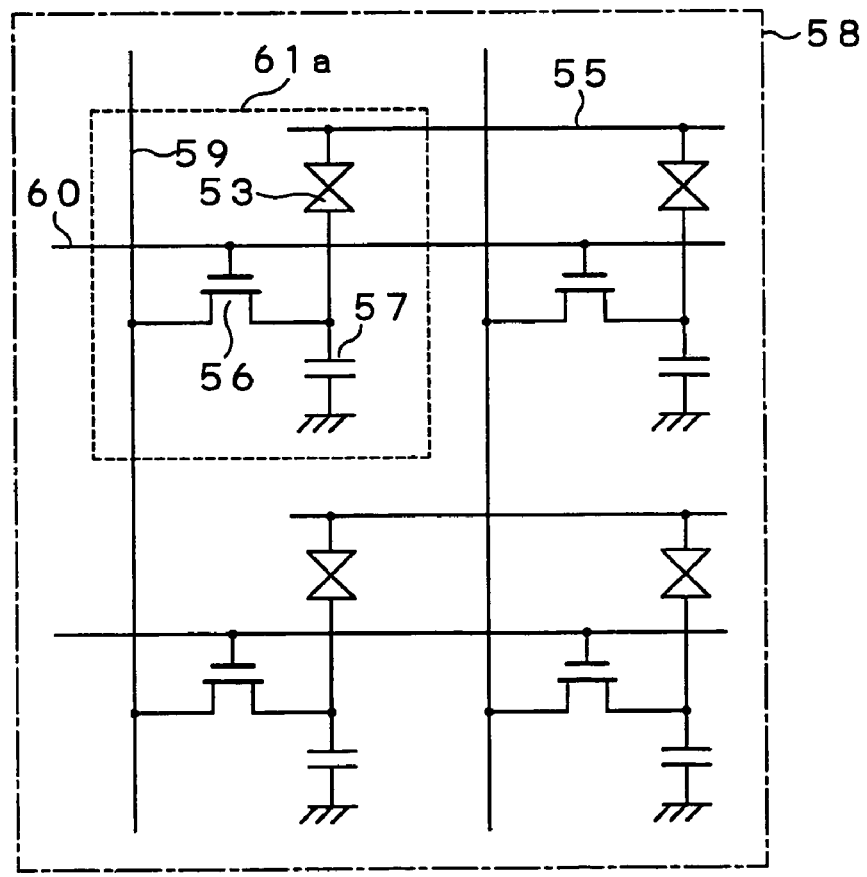
FIG. 12 is a circuit diagram of a switching drive circuit included in the reflection type liquid crystal display element.

As shown in FIGS. 10, 11 and 12, the drive circuit board 52 includes a silicon substrate 52a having formed for each pixel in the form of a matrix for each of a plurality of pixels thereon a switching drive circuit 58 including a FET (Field Effect Transistor) 56 of a C-MOS (Complementary-Metal Oxide Semiconductor) or n-channel MOS type, and an auxiliary capacitor 57 to apply a voltage to the liquid crystal layer 53. Namely, the FETs 56 and capacitors 57 are disposed in lines and columns. Also, on the silicon substrate 52a, there are formed signals lines 59 electrically connected to sources of the FETs 56 and scanning lines 60 electrically connected to gates of the FETs 56 in directions perpendicular to each other. The signal lines 59 and scanning lines 60 are disposed to intersect each other at pixels 61 a in the display area 61. Outside the display area 61, there is formed a logic section including a signal driver 62 to apply a display voltage to each of the signal lines 59 and a scan driver 63 to apply a selection pulse to each of the scanning lines 60. It should be noted that the switching drive circuit 58 is normally produced in a process in which there is required a higher dielectric strength than that of the logic circuit because the transistor has to have a dielectric strength corresponding to the drive voltage to the liquid crystal layer 53.

Also, on the silicon substrate 52a, there is formed a plurality of generally-square reflection pixel electrodes 64 electrically connected to drains of the FETs 56 in the form of a matrix for each of the pixels 61a. The reflection pixel electrodes 64 are formed from a metal film of aluminum (Al), for example, showing a high reflectance in the visible region, more specifically, a metal film containing aluminum (Al) as the base and several percents by weight of copper (Cu) used as a wire in the LSI production process and silicon (Si) added to the base. The reflection pixel electrodes 64 function to reflect incident light from the transparent substrate 51, and it applies a voltage to the liquid crystal layer 53. For a higher reflectance, the reflection pixel electrodes 64 may have a dielectric mirror-like multilayer film laminated on the Al layer thereof.

Note that the side length of the reflection pixel electrode 64 is about 8.4 μm and the gap between the adjacent reflection pixel electrodes 64, namely, the so-called pixel space, is about 0.6 μm (normally, 0.3 to 0.7 μm) by way of example herein. Therefore, the pixel pitch defined between adjacent reflection pixel electrodes 64 is about 9 (=8.4+0.6) μm (normally about 7 to 15 μm). Also, the reflection pixel electrodes 64 are about 150 to 250 μm thick.

Also, on the surfaces, opposite to each other, of the transparent electrode 51 and drive circuit board 52, there are formed alignment films 65 and 66, respectively, which cover the transparent electrode 55 and reflection pixel electrodes 64, respectively. To align liquid crystal molecules 53a, which will further be described later, of the liquid crystal layer 53 in a predetermined direction, the alignment films 65 and 66 are formed from an obliquely evaporated membrane formed by depositing an inorganic material such as silicon dioxide ($SiO_2$) or the like obliquely onto the silicon substrate 52a or a polymer membrane of polyimide or the like having a rubbed surface. It should be noted that the pretilting direction and angle of the liquid crystal layer 53 are controlled by controlling the direction of incidence and evaporation angle for the obliquely-evaporated membrane or by controlling the rubbing direction and conditions for the polymer membrane. Normally, the practical pretilt angle is about 45 to 65 deg. in relation to the light normal to the substrate.

The liquid crystal layer 53 is formed from a vertically-aligned liquid crystal in which nematic liquid crystal having a negative dielectric anisotropy is vertically aligned by the above-mentioned alignment films 65 and 66. In this vertically-aligned liquid crystal, when applied with no drive voltage, the liquid crystal molecules 53a are aligned nearly perpendicularly to the silicon substrate 52a and provide a display in black in a so-called "normally black display mode". On the other hand, when applied with a drive voltage, the liquid crystal molecules 53a are tilted in a predetermined direction to have the light transmittance thereof varied due to a birefringence developed at that time of tilting. Also, in the vertically-aligned liquid crystal, since the contrast will not be uniform as shown in FIGS. 2 and 3 unless liquid crystal molecules 53a are tilted in the same directions, so the liquid crystal is vertically aligned by tilting the long axis of the liquid crystal molecules 53a through a slight pretilt angle θ in a constant direction X in relation to a line normal to a drive circuit board 52 having the reflection pixel electrodes 64 formed thereon. The pretilted direction X, that is, the direction in which the liquid crystal molecules 53a are to be aligned, is set nearly diagonal to a display area 61 where the transmittance is caused to be maximum by a combination with an optical system such as a polarization plate and the like, namely, in a direction of about 45 deg. that is a nearly diagonal direction of the reflection pixel electrodes 64 laid in the form of a nearly square matrix. Also, if the pretilt angle θ is too large, the vertical alignment will be deteriorated, the black level will rise to lower the contrast and the V–T (drive voltage–transmittance) curve will be adversely affected. Therefore, the pretilt angle θ is normally controlled to fall within a range of 1 to 7 deg.

The sealing member 54 is formed from an epoxy resin or the like to provide a sealing of several micrometers in thickness between the alignment films 65 and 66 with glass beads (not shown) being dispersed between the transparent substrate 51 and drive circuit board 52. It should be noted that the sealing member 54 may be formed to cover the side faces of the alignment films 65 and 66.

In the reflection type liquid crystal display element 50 constructed as above, incident light from the transparent substrate 51 passes the liquid crystal layer 53 and is reflected by the reflection pixel electrodes 64 at the drive circuit board 52. The reflected light travels in a direction opposite to its direction of incidence, passes by the liquid crystal layer 53 and transparent substrate 51 and outgoes from the transparent substrate 51. At this time, the liquid crystal layer 53 has the optical characteristic thereof varied correspondingly to a potential difference of a drive voltage applied between the transparent electrode 55 and reflection pixel electrodes 64 to module the light passing by. Therefore, the reflection type liquid crystal display element 50 can assign intensity levels by the light modulation, and utilize the modulated reflected light in displaying an image.

As shown in FIG. 9, the synthesizing prism 6 is a so-called cross-cube prism. It functions to synthesize color rays of light (R, G and B) of the other modulated light component (P-polarized light component, for example) having passed by the polarizing beam splitters 13R, 13G and 13B, and it lets the synthetic light go out toward the projection lens 7. More particularly, the synthesizing prism 6 is composed of four right-angle prisms attached together, and has formed on each of the surfaces, attached to each other, of the component prisms a dichroic layer which will reflect light having a specific wavelength. The synthesizing prism 6 synthesizes these color rays of light (R, G and B) into one image by reflecting red light (R) modulated by the liquid crystal display panel 5R toward the projection lens 7, allowing green light (G) modulated by the liquid crystal display panel 5G to pass by toward the projection lens 7, and reflecting blue light (B) modulated by the liquid crystal display panel 5B toward the projection lens 7.

The projection lens 7 functions to project the light from the synthesizing prism 6, in a larger scale, toward the screen S.

In the reflection type liquid crystal projector 1 constructed as above, the dichroic color separation filter 3 and dichroic mirror 4 separate white light emitted from the lamp 2 into red light (R), green light (G) and blue light (B). The red light (R), green light (G) and blue light (B) thus separated are S-polarized components, and pass by the polarizing beam splitters 13R, 13G and 13B and are incident upon the liquid crystal display panels 5R, 5G and 5B, respectively. The red light (R), green light (G) and blue light (B) incident upon the liquid crystal display panels 5R, 5G and 5B, respectively, undergo polarization modulation correspondingly to a drive voltage applied to each pixel of the liquid crystal display panels 5R, 5G and 5B on the basis of video data, and then reflected toward the polarizing beam splitters 13R, 13G and 13B. Only P-polarized light components of the red light (R), green light (G) and blue light (B) thus modulated will be allowed to pass by the polarizing beam splitters 13R, 13G and 13B, respectively, be synthesized by the synthesizing prism 6 into one image, and the light thus synthesized be projected through the projection lens 7 onto the screen S. Thus, a color image will be displayed in a larger scale on the screen S.

Note here that in the reflection type liquid crystal projector 1, the green image from the liquid crystal display panel 5G is displayed being horizontally inverted in relation to the red and blue images from the liquid crystal display panels 5R and 5B so that the image synthesized by the synthesizing prism 6 will coincide with the green image on the screen S.

Also, in the reflection type liquid crystal projector 1, a color image is displayed by projecting images corresponding to rays of light modulated by the liquid crystal display panels 5R, 5G and 5B onto the screen S. When the drive voltage is zero, the reflection type liquid crystal display element 50 forming each of the liquid crystal display panels 5R, 5G and 5B will reflect an incident S-polarized light component as it is. In this case, the red light (R), green light (G) and blue light (B) will not pass by the polarizing beam splitters 13R, 13G and 13B, respectively, and provide a display in black in the so-called "normally black display mode". Also, in the reflection type liquid crystal display element 50, the transmittance will increase because the drive voltage rises and the P-polarized light component having undergone the polarization modulation.

In the reflection type liquid crystal projector 1, the aforementioned liquid crystal display panels 5R, 5G and 5B, synthesizing prism 6 and polarizing beam splitters 13R, 13G and 13B are formed integrally with each other to build one optical block 20. Because of such an optical block 20, the reflection type liquid crystal projector 1 according to the present invention is designed more compact.

Note here that in the reflection type liquid crystal projector 1, the liquid crystal display panel 5G which provides an image inverted in relation to images provided by the liquid crystal display panels 5R and 5B has different alignment direction from those of the liquid crystal display panels 5R and 5B, so that the alignment directions of the liquid crystal display panels 5R, 5G and 5B (the alignment directions of the liquid crystal molecules of the liquid crystal display panels) will be coincident with each other in an image displayed on the screen S.

In this case, when the synthesizing prism 6 synthesizes color rays of light (R, G and B) modulated by the liquid crystal display panels 5R, 5G and 5B into one image, disclinations taking place in the liquid crystal display panels 5R, 5G and 5B can be made to coincide in shape, size and the like with each other in an image formed, on the screen S, from the light synthesized by the synthetic prism 6.

Figure 5:
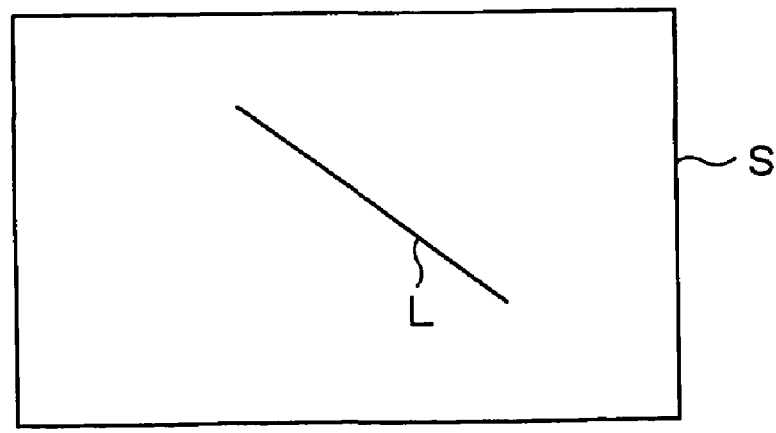
FIG. 5 is a plan view of an oblique line displayed on a screen.

The above will be explained in further detail taking, as an example, the display of the black oblique line L (leftward-ascending oblique line, for example) in white display on the screen S as shown in FIG. 5.

Figure 13A:
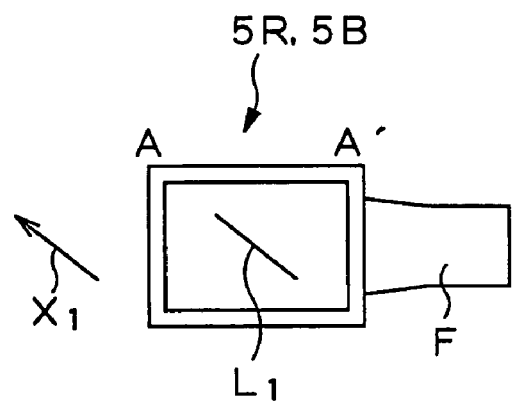
FIG. 13A is a plan view of a direction of an oblique line displayed on red and blue liquid crystal display panels included in the liquid crystal projector according to the present invention and an alignment direction of the red and blue liquid crystal display panels.
Figure 13B:
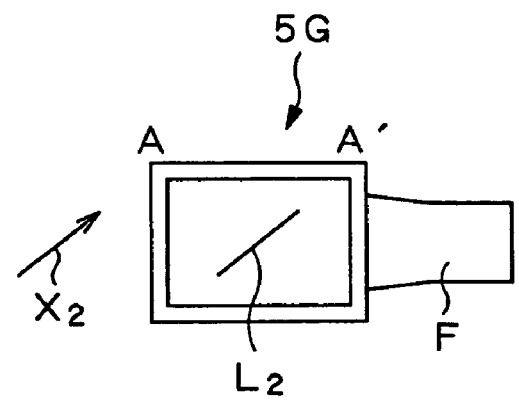
FIG. 13B is a plan view of a direction of an oblique line displayed on a green liquid crystal display panel included in the liquid crystal projector and an alignment direction of the green liquid crystal display panel.

In the reflection type liquid crystal projector 1, the liquid crystal display panel 5G shown in FIG. 13B displays a rightward-ascending line L2 horizontally inverted in relation to a leftward-ascending oblique line L1 displayed by each of the liquid crystal display panels 5R and 5B shown in FIG. 13A so that images synthesized by the synthesizing prism 6 will coincide with each other on the screen S.

The alignment direction X1 of the liquid crystal display panels 5R and 5B in FIG. 13A is set to ascend leftward at an angle of about 45 deg. with the flexible wire F being viewed at the right. Namely, the alignment direction X1 is nearly diagonal of the display area 61 of the aforementioned liquid crystal display element 50. Therefore, the leftward-ascending oblique line L1 and alignment direction X1 are nearly coincident with each other in these liquid crystal display panels 5R and 5B.

On the other hand, the liquid crystal display panel 5G shown in FIG. 13B is aligned in a direction in which the alignment direction X1 of the liquid crystal display panels 5R and 5B is inverted correspondingly to inversion of an image. Therefore, the alignment direction X2 of the liquid crystal display panel 5G is set to ascend rightward at an angle of 45 deg. with the flexible wire F being viewed at the right. Namely, the directions X2 and X1 form an angle of about 90 deg. between them in the plane where they are. That is, in the liquid crystal display panel 5G, the rightward-ascending oblique line L2 and alignment direction X2 are coincident with each other.

Figure 14A:
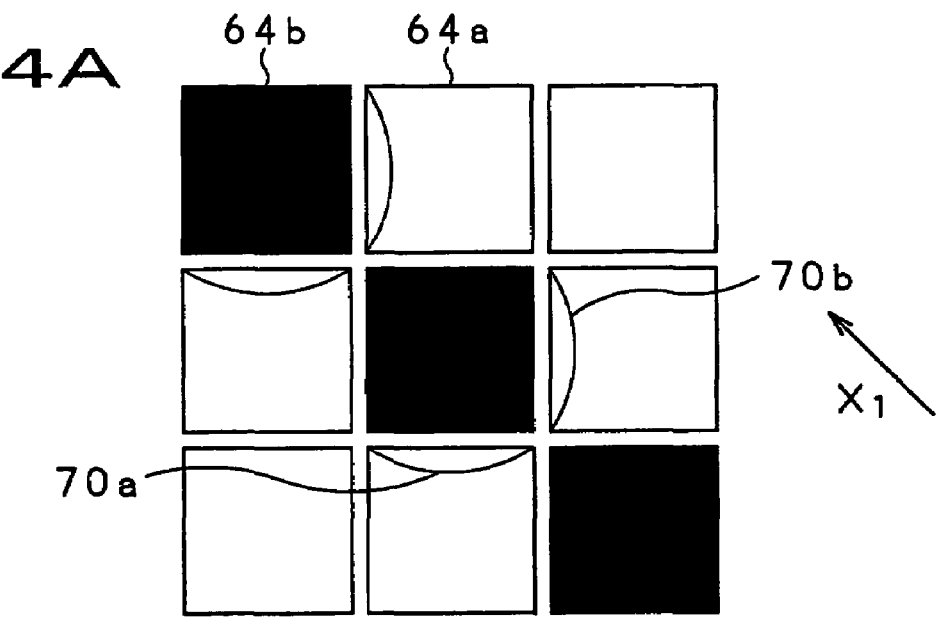
FIG. 14A is a plan view, enlarged in scale, of pixels of the red and blue liquid crystal display panels included in the liquid crystal projector according to the present invention.

Since in the liquid crystal display panels 5R and 5B shown in FIG. 13A, a leftward-ascending oblique line having a thickness of one pixel is represented by black-display pixels 64b in white-display pixels 64a as shown in a larger scale in FIG. 14A, curved disclination lines 70a and 70b are formed to extend along the boundaries between the white-display pixel 64a adjacent to the black-display pixels 64b and black-display pixels 64b from a corner (upper left corner as shown in FIG. 14A) located in the alignment direction X1.

Figure 14B:
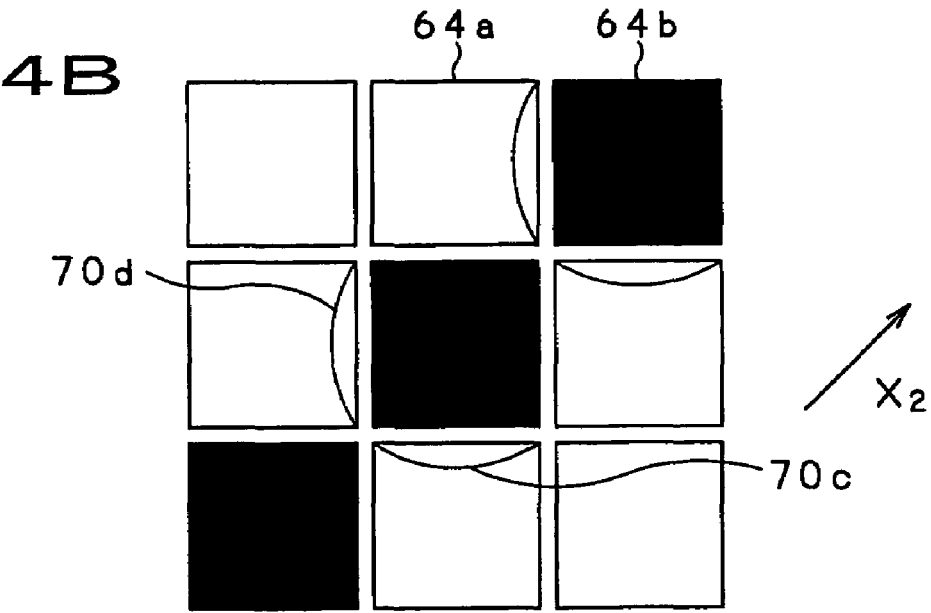
FIG. 14B is a plan view, enlarged in scale, of pixels of the green liquid crystal display panel included in the liquid crystal projector.

On the other hand, since in the liquid crystal display panel 5G shown in FIG. 13B, a rightward-ascending oblique line having a thickness of one pixel is represented by the black-display pixels 64b in the white-display pixels 64a as shown in a larger scale in FIG. 14B, curved disclination lines 70c and 70d are formed to extend along the boundaries between the white-display pixel 64a adjacent to the black-display pixels 64b and black-display pixels 64b from a corner (upper right corner as shown in FIG. 14B) located in the alignment direction X2.

Figure 15:
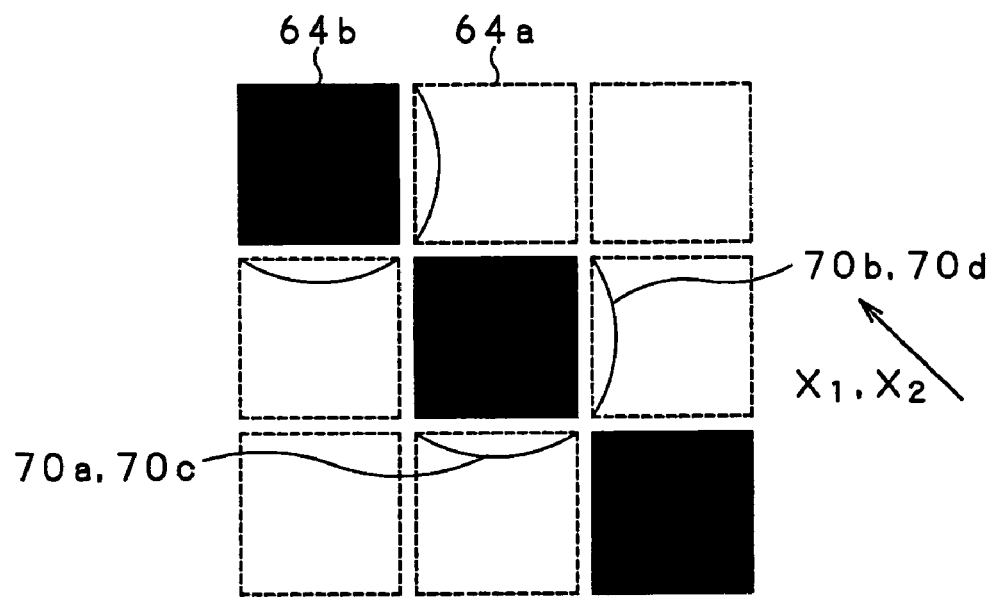
FIG. 15 is a plan view, enlarged in scale, of an oblique line projected on the screen in the liquid crystal projector.

Therefore, in the aforementioned liquid crystal projector 1, when color rays of light (R, G and B) modulated by the three liquid crystal display panels 5R, 5G and 5B are synthesized by the synthesizing prism 6 into one image and a leftward-ascending black oblique line L is displayed in white display on the screen S, the disclination lines 70a and 70b taking place at the liquid crystal display panels 5R and 5B and disclination lines 70c and 70d taking place at the liquid crystal display panel 5G can be made to coincide with each other on the screen S as shown in a larger scale in FIG. 15.

As above, the reflection type liquid crystal projector 1 can appropriately display a leftward-ascending black oblique line L in white display on the screen S. On the contrary, even if a rightward-ascending black oblique line L is displayed in white display on the screen S, the line L can be displayed appropriately.

As having been described in the foregoing, with the reflection type liquid crystal projector 1 according to the present invention, it is possible to prevent color staining from taking place in display of an oblique line and thus provide a quality image display by aligning the liquid crystal molecules of the liquid crystal display panel 5G which provides an image inverted in relation to those provided by the other liquid crystal display panels 5R and 5B in a direction different from those in which the liquid crystal molecules of the liquid crystal display panels 5R and 5B are aligned, so that the alignment directions of the liquid crystal display panels 5R, 5G and 5B will be coincident with each other in an image displayed on the screen S.

EMBODIMENT

Next, an actually produced embodiment of the reflection type liquid crystal projector 1 according to the present invention will be explained. A comparative example prepared for comparison with the embodiment will also be described.

Embodiment

According to the embodiment of the present invention, the reflection type liquid crystal display element 50 was produced for each of the three liquid crystal display panels 5R, 5G and 5B of the reflection type liquid crystal projector 1. More specifically, to produce the reflection type liquid crystal display element, there were produced the glass substrate having the transparent electrode formed thereon from an ITO layer, and the silicon substrate having the square reflection pixel electrodes formed thereon from an Al layer. After the electrodes were washed, the alignment film of silicon dioxide was obliquely evaporated by an evaporation apparatus on the glass and silicon substrates. It should be noted that the pixel pitch of the reflection pixel electrodes was 9 µm, ad the pixel space C was 0.6 µm. The alignment film was 50 nm thick, and the angle of evaporation of the alignment film was controlled to 55 deg. for the pretilt angle of the liquid crystal to be about 2.5 deg. Also, the liquid crystal was pretilted (liquid crystal molecules were aligned) nearly diagonally of the reflection pixel electrode. Next, an appropriate number of glass beads of 2 µm in diameter were dispersed between both the substrates each having the alignment film formed thereon, and the sealing member of epoxy resin was used to seal the edges of the substrates being placed opposite to each other. Next, a nematic liquid crystal material having a negative dielectric anisotropy (available from Merck Ltd.) was injected to between the substrates to form the reflection type liquid crystal display element 50 having a cell thickness of 2 µm.

The reflection type liquid crystal display element 50 was produced in two types A and B. In the type A, the alignment direction was set to ascend leftward at an angle of about 45 deg. nearly diagonally of the reflection pixel electrode with the flexible wire F being viewed at the right. In the type B, alignment direction was set to ascend rightward at an angle of about 45 deg. with the flexible wire F being viewed at the right.

The liquid crystal display panels 5R and 5B used the type A, while the liquid crystal display panel 5G used the type B. They were assembled together to produce the reflection type liquid crystal projector 1 according to the embodiment of the present invention.

Comparative Example

A comparative reflection type liquid crystal projector 1 was made similarly to the embodiment of the present invention except that each of the aforementioned liquid crystal display panels 5R, 5G and 5R used the type A.

The occurrence of color staining on an image displayed on the screen S was observed on each of the reflection type liquid crystal projector according to the embodiment and comparative reflection type liquid crystal projector.

Figure 16A:
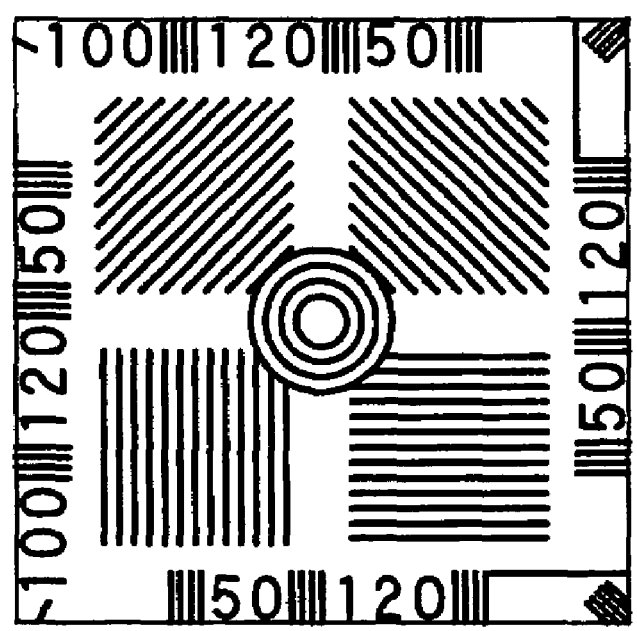
FIG. 16A shows a monoscopic pattern for image evaluation.
Figure 16B:
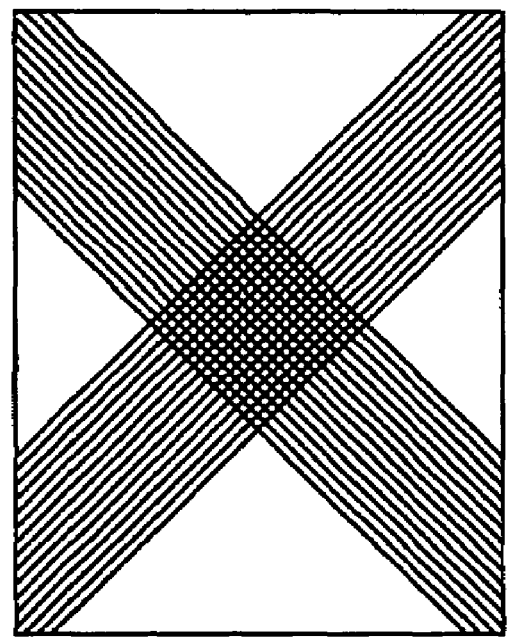
FIG. 16B shows a plurality of oblique lines for image evaluation.
Figure 17:
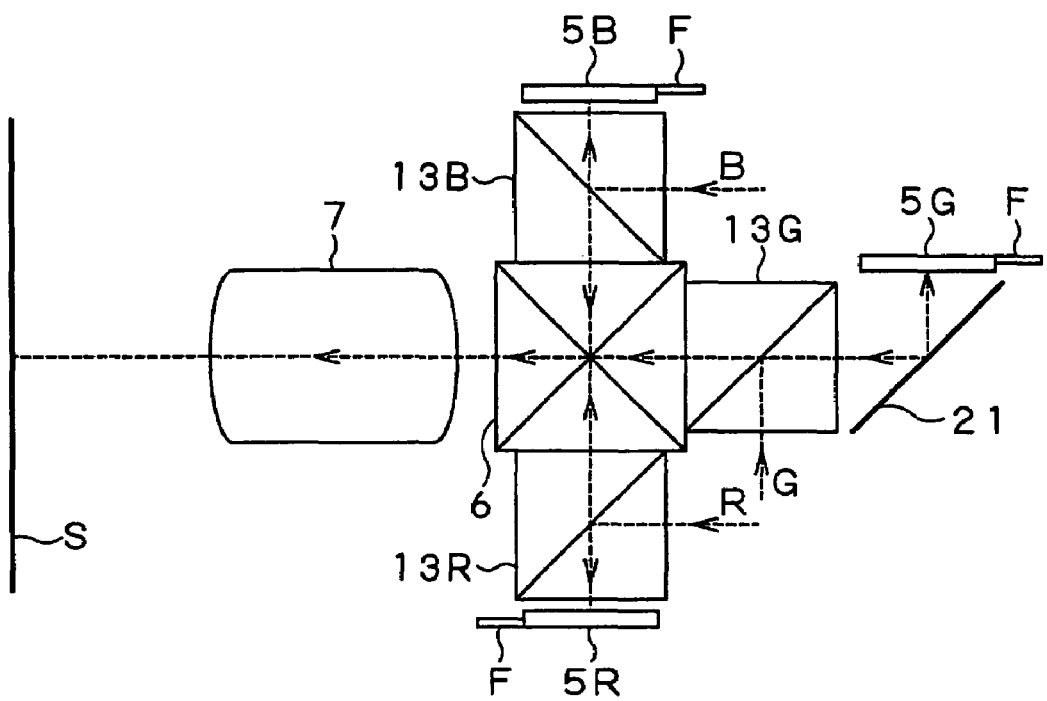
FIG. 17 is a block diagram of a variant of the liquid crystal projector for comparison with the liquid crystal projector according to the present invention.

Note that a monoscopic pattern shown in FIG. 16A was used as an image for the above observation. Right and left oblique lines at the central portion of the monoscopic pattern were observed. Further, there were used for such an observation a plurality of leftward-ascending oblique lines each having a thickness of one pixel and a plurality of rightward-ascending oblique lines each having a thickness of one pixel, formed in white display as shown in FIG. 16B.

In the comparative reflection type liquid crystal projector, the rightward-ascending oblique lines which should be displayed in black appeared as oblique lines having a color which will be resulted from mixing of black and magenta, and the rightward-ascending oblique lines appeared greenish-black ones separately from the leftward-ascending oblique lines.

On the other hand, in the reflection type liquid crystal projector according to the embodiment, there was found no such color staining. Also, in this embodiment using the liquid crystal display element of the type B as the liquid crystal display panels 5R and 5B while using the type A as the liquid crystal display panel 5G, there was also found no such color staining.

As will be known from the above, the problem of color staining can be solved and hence image quality degradation can be prevented by aligning the liquid crystal molecules of the liquid crystal display panel which provides an image inverted in relation to those provided by the other liquid crystal display panels in the direction in which the alignment direction of the other liquid crystal display panels is inverted.

The plurality of liquid crystal display panels used in the liquid crystal projector 1 can be sorted into the liquid crystal display panel 5G which provides an inverted image and the liquid crystal display panels 5R and 5B depending upon which the number of times the modulated color rays of light (R, G and B) are reflected until they are synthesized by the synthesizing prism 6 is, odd or even (including zero).

Therefore, a total-reflection mirror 21 additionally provided between the liquid crystal display panel 5G and polarizing beam splitter 13G in the aforementioned liquid crystal projector 1 as shown in FIG. 7 permits the liquid crystal display panels 5R, 5G and 5B all of the same type to display an image without having to invert the image displayed on the liquid crystal display panel 5G.

However, the addition of the reflection mirror 21 in the optical block 20 will cause the optical distances from the liquid crystal display panels 5R, 5G and 5B to the synthesizing prism 6 to be different from each other, resulting in a reduction of brightness or a similar problem. Also, to equalize the optical distances, the optical block 20 as a whole has to be designed larger, which will lead to an increased number of parts and thus cannot disadvantageously attain a compact design of the reflection type liquid crystal projector 1.

Figure 18:
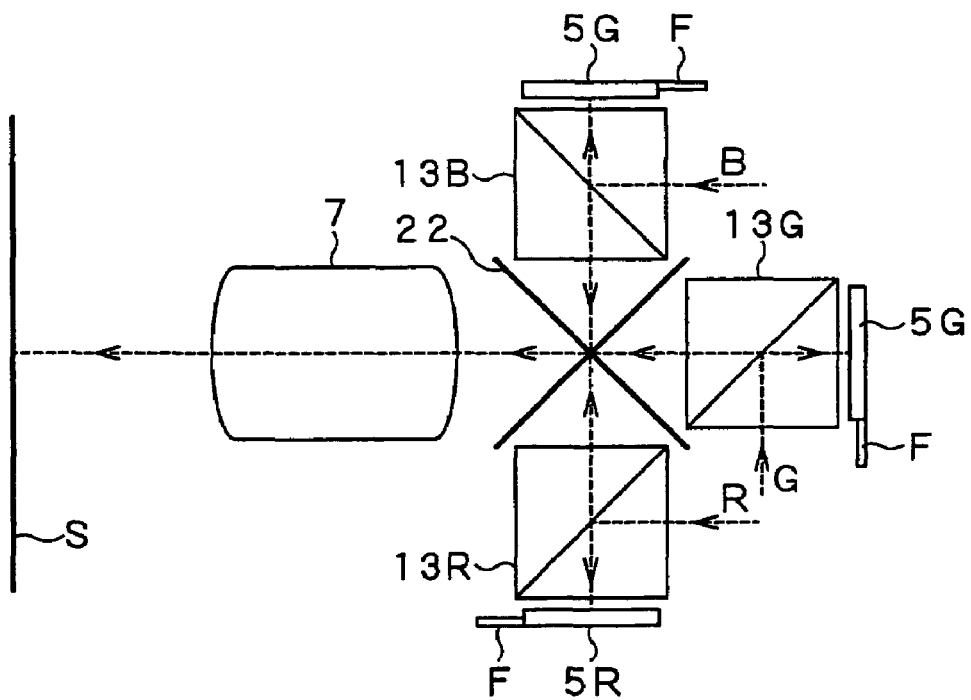
FIG. 18 is a block diagram of a first variant of the liquid crystal projector according to the present invention.

Note that the present invention is not limited to the aforementioned construction of the reflection type liquid crystal projector 1 shown in FIG. 9 but is applicable to a construction in which a dichroic cross mirror 22 formed from a combination of two dichroic mirrors is used as a light synthesizing means in place of the synthesizing prism 6, for example, as in a first variant shown in FIG. 18.

Also in this case, the color rays of light (R, G and B) can be synthesized into one image by reflecting red light (R) modulated by the liquid crystal display panel 5R toward the projection lens 7, allowing green light (G) modulated by the liquid crystal display panel 5G to pass by to the projection lens 7 and reflecting blue light (B) modulated by the liquid crystal display panel 5B toward the projection lens 7.

Figure 19:
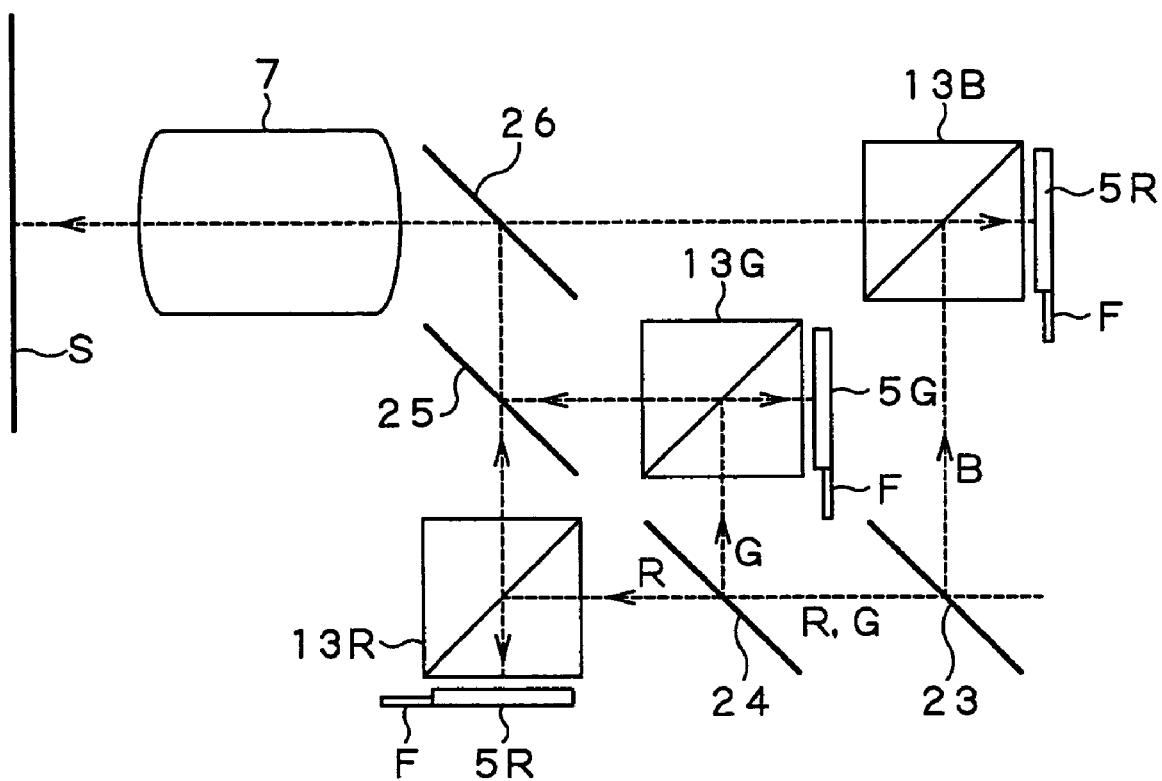
FIG. 19 is a block diagram of a second variant of the liquid crystal projector according to the present invention.

Also, the reflection type liquid crystal projector according to the present invention may use four dichroic mirrors 23, 24, 25 and 26 in place of the synthesizing prism 6 as in a second variant shown in FIG. 19.

Of the above four dichroic mirrors, the dichroic mirror 23 functions to separate white light emitted from the lamp 2 into blue light (B) and other color rays of light (R and G), and it reflects he separated blue light (B) toward the polarizing beam splitter 13B while allowing the other color rays of light (R and G) to pass by. The dichroic mirror 24 functions to separate the other color rays of light (R and G) into red light (R) and green light (G), and it allows the separated red light (R) to pass by toward the polarizing beam splitter 13R while reflecting the separated green light (G) toward the polarizing beam splitter 13G. The dichroic mirror 24 allows the red light (R) modulated by the liquid crystal panel 13R to pass by toward the dichroic mirror 25 while reflecting the green light (G) modulated by the liquid crystal display panel 13G toward the dichroic mirror 25. The dichroic mirror 25 allows the blue light (B) modulated by the liquid crystal display panel 5B to pass by toward the projection lens 7 while reflecting the red and green rays of light (R and G) modulated by the liquid crystal display panels 5R and 5G toward the projection lens 7. In this case as well, the color rays of light (R, G and B) can be synthesized into one image.

Note that the present invention is not limited to the aforementioned reflection type liquid crystal projector 1 but is widely applicable to a projection type liquid crystal display device which displays an image by synthesizing a plurality of color rays modulated based on video data and projecting the synthetic light onto a screen.

Also, the present invention is not limited to the reflection type liquid crystal display elements using the aforementioned vertically-aligned liquid crystal but it is widely applicable to a projection type liquid crystal display device which uses liquid crystal display elements not of the aforementioned types and which will incur no disclination.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

What is claimed is:

1. A projection type liquid crystal display device comprising:
a plurality of liquid crystal display panels provided correspondingly to a plurality of colored lights and modulating the plurality of colored lights based on video data, each one of the plurality of liquid crystal display panels having a disclination pattern at a part of an on-pixel adjacent to an off-pixel, said disclination pattern comprising disclination lines extending along boundaries between the on-pixel and the off-pixel;
a light synthesizing unit for synthesizing the colored light modulated by the liquid crystal display panels, respectively, into one image; and
a projecting unit for projecting the synthetic light produced by the light synthesizing unit onto a screen, wherein,
the alignment direction of one of the plurality of the liquid crystal display panels which provides an image inverted in relation to images provided by the other liquid crystal display panels is arranged to form a substantially 90 degree angle with the alignment directions of the other liquid crystal display panels, so that said respective disclination lines of said disclination pattern corresponding to said on-pixel of each one of the plurality of the liquid crystal display panels substantially coincide with each other in an image displayed on the screen.

2. The device according to claim 1, further comprising:
a light source; and
a light separating unit for separating light emitted from the light source into a plurality of colored light, wherein,
the plurality of liquid crystal display panels modulate the plurality of colored light separated by the light separating unit.

3. The device according to claim 2, wherein:
the light separating unit separates the light emitted from the light source into colored light corresponding to three primary colors of red, green and blue;
the plurality of liquid crystal display elements includes three liquid crystal display panels corresponding to the red, green and blue as the three primary colors; and
at least the alignment direction of one of the liquid crystal display panels is different from the alignment direction of the other liquid crystal display panels.

4. The device according to claim 1, wherein the alignment direction of the liquid crystal display panel displaying the inverted image is arranged to a direction which the alignment directions of the other liquid crystal display panels are inverted corresponding to the image inversion by the light synthesizing unit.

5. The device according to claim 4, wherein the alignment direction of the liquid crystal display panel displaying the inverted image is different about 90 deg. from the alignment directions of the other liquid crystal display panels in the plane of the liquid crystal display panel.

6. The device according to claim 1, wherein the alignment direction of the liquid crystal display panel is generally diagonal direction of the pixels forming a display area.

7. The device according to claim 1, wherein the liquid crystal display panel is driven by a frame inversion drive which inverts the polarity of a drive voltage for each video signal frame.

8. The device according to claim 1, wherein the gap between the adjacent ones of the reflective pixel electrodes is 0.7 µm or less.

9. The device according to claim 1, wherein
the plurality of liquid crystal display panels are sorted into a first group of the liquid crystal display panel which provides an inverted image and a second group of the other liquid crystal display panels depending upon a number of times of the reflection of the reflected modulated light is odd, even or zero until they are synthesized by the synthesizing prism.

10. An optical block for use in a projection type liquid crystal display device in which a plurality of colored light modulated based on video data are synthesized into one image and the synthetic light is projected as an image onto a screen, the optical block comprising:
a plurality of liquid crystal display panels provided correspondingly to the plurality of colored light and which modulate the colored light based on video data, each one of the plurality of liquid crystal display panels having a disclination pattern at a part of an on-pixel adjacent to an off-pixel, said disclination pattern comprising disclination lines extending along boundaries between the on-pixel and the off-pixel; and
a light synthesizing unit for synthesizing the colored light modulated by the liquid crystal display panels, respectively, into one image,
wherein,
an alignment direction of one of the plurality of the liquid crystal display panels which provides an image inverted in relation to images provided by the other liquid crystal display panels is arranged to form a substantially 90 degree angle with the alignment directions of the other liquid crystal display panels, so that said respective disclination lines of said disclination pattern corresponding to said on-pixel of each one of the plurality of the liquid crystal display panels substantially coincide with each other in an image displayed on the screen.

11. The optical block according to claim 10, wherein the plurality of liquid crystal display panels includes three liquid crystal display panels corresponding to the red, green and blue as three primary colors, and at least the alignment direction of one of the liquid crystal display panels is different from the alignment direction of the other liquid crystal display panels.

12. The optical block according to claim 10, wherein the alignment direction of the liquid crystal display panel displaying the inverted image is arranged to a direction which the alignment directions of the other liquid crystal display panels are inverted corresponding to the image inversion by the light synthesizing unit.

13. The optical block according to claim 12, wherein the alignment direction of the liquid crystal display panel displaying the inverted image is different about 90 deg. from the alignment directions of the other liquid crystal display panels in the plane of the liquid crystal display panel.

14. The optical block according to claim 10, wherein the alignment direction of the liquid crystal display panel is generally diagonal direction of the pixels forming a display area.

15. The optical block according to claim 10, wherein the liquid crystal display element is driven by a frame inversion drive which inverts the polarity of a drive voltage for each video signal frame.

16. The optical block according to claim 10, wherein the gap between the adjacent ones of the reflective pixel electrodes is 0.7 µm or less.

17. The optical block according to claim 10, wherein the plurality of liquid crystal display panels are sorted into a first group of the liquid crystal display panel which provides an inverted image and a second group of the other liquid crystal display panels depending upon a number of times of the reflection of the reflected modulated light is odd, even or zero until they are synthesized by the synthesizing prism.

* * * * *